United States Patent
Hennings

(12) United States Patent (10) Patent No.: US 8,746,380 B2
Hennings (45) Date of Patent: Jun. 10, 2014

(54) METHOD FOR OPERATION OF A BRAKING SYSTEM OF A HYBRID VEHICLE, BRAKING SYSTEM AND VEHICLE

(75) Inventor: Stephan Hennings, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 592 days.

(21) Appl. No.: 13/019,721

(22) Filed: Feb. 2, 2011

(65) Prior Publication Data

US 2011/0192661 A1 Aug. 11, 2011

(30) Foreign Application Priority Data

Feb. 8, 2010 (DE) .................. 10 2010 008 020

(51) Int. Cl.
 *B60K 6/00* (2007.10)
(52) U.S. Cl.
 USPC ............. 180/65.275; 180/65.285; 180/65.29
(58) Field of Classification Search
 USPC ............................ 180/65.21–65.6; 701/70, 78
 See application file for complete search history.

(56) References Cited

U.S. PATENT DOCUMENTS

| | | | | |
|---|---|---|---|---|
| 5,345,761 A * | 9/1994 | King et al. | ............... | 60/274 |
| 5,568,962 A * | 10/1996 | Enomoto et al. | ................ | 303/3 |
| 5,632,534 A * | 5/1997 | Knechtges | ................ | 303/152 |
| 5,842,534 A * | 12/1998 | Frank | ................ | 180/65.25 |
| 5,879,062 A * | 3/1999 | Koga et al. | ................ | 303/152 |
| 6,116,363 A * | 9/2000 | Frank | ................ | 180/65.25 |
| 6,244,674 B1 * | 6/2001 | Kuno et al. | ................ | 303/152 |
| 6,457,784 B1 * | 10/2002 | Bohm et al. | ................ | 303/155 |
| 6,510,911 B1 * | 1/2003 | Satou et al. | ................ | 180/65.245 |
| 6,813,553 B2 * | 11/2004 | Nakamura et al. | ............... | 701/70 |
| 6,976,741 B2 * | 12/2005 | Hara et al. | ................ | 303/113.1 |
| 6,988,779 B2 * | 1/2006 | Amanuma et al. | ............ | 303/152 |
| 7,034,482 B2 * | 4/2006 | Komiyama et al. | ........... | 318/376 |
| 7,136,737 B2 * | 11/2006 | Ashizawa et al. | ............... | 701/70 |
| 7,311,163 B2 * | 12/2007 | Oliver | ........................ | 180/165 |
| 7,409,280 B2 * | 8/2008 | Nakamura et al. | ............... | 701/70 |
| 7,575,287 B2 * | 8/2009 | Matsuura et al. | ............. | 303/152 |
| 7,702,432 B2 * | 4/2010 | Bandai et al. | .................... | 701/22 |
| 7,708,095 B2 * | 5/2010 | Hirata | ....................... | 180/65.275 |
| 7,722,135 B2 * | 5/2010 | Yang | ............................. | 303/152 |
| 7,766,107 B2 * | 8/2010 | Joe et al. | .................... | 180/65.21 |
| 7,925,411 B2 * | 4/2011 | Fuhrer et al. | .................... | 701/81 |
| 8,033,955 B2 * | 10/2011 | Farnsworth | ........................ | 477/7 |
| 8,055,422 B2 * | 11/2011 | Yurgil | ............................. | 701/70 |
| 8,135,526 B2 * | 3/2012 | Minarcin et al. | ................ | 701/70 |
| 8,190,344 B2 * | 5/2012 | Krueger et al. | ................. | 701/70 |
| 8,204,664 B2 * | 6/2012 | Minarcin et al. | ................ | 701/70 |

(Continued)

FOREIGN PATENT DOCUMENTS

DE 198 10 656 9/1999
DE 10 2005 039 314 2/2007

(Continued)

*Primary Examiner* — Katy M Ebner
(74) *Attorney, Agent, or Firm* — Gerald E. Hespos; Michael J. Porco; Matthew T. Hespos

(57) ABSTRACT

A method is provided for operating a braking system of a hybrid vehicle that can be driven by an internal combustion engine and an electrical machine. A brake pressure for a mechanical brake in the braking system is reduced during braking with recuperation, in comparison to the brake pressure during braking without recuperation. A braking system and a vehicle having a braking system that functions in accordance with the method also are provided.

20 Claims, 3 Drawing Sheets

(56) References Cited

U.S. PATENT DOCUMENTS

| | | | |
|---|---|---|---|
| 8,255,137 B2 * | 8/2012 | Jinno et al. | 701/70 |
| 8,315,754 B2 * | 11/2012 | Ajiro | 701/22 |
| 8,388,071 B2 * | 3/2013 | Yokoyama et al. | 303/152 |
| 8,396,618 B2 * | 3/2013 | Cikanek et al. | 701/22 |
| 2007/0013230 A1 | 1/2007 | Yang | |
| 2007/0296264 A1 | 12/2007 | Haupt et al. | |
| 2009/0299591 A1 | 12/2009 | Broeckel et al. | |

FOREIGN PATENT DOCUMENTS

| | | |
|---|---|---|
| DE | 10 2007 030 441 | 1/2009 |
| DE | 10 2008 044 002 | 5/2010 |
| WO | 2004/101308 | 11/2004 |

* cited by examiner

METHOD FOR OPERATION OF A BRAKING SYSTEM OF A HYBRID VEHICLE, BRAKING SYSTEM AND VEHICLE

CROSS-REFERENCE TO RELATED APPLICATION

This application claims priority under 35 USC 119 to German Patent Application No. 10 2010 008 020.9, filed on Feb. 8, 2010, the entire disclosure of which is incorporated herein by reference.

BACKGROUND OF THE INVENTION

1. Field of the Invention

The invention relates to a method for operation of a braking system of a vehicle that can be driven in a hybrid form. The invention also relates to a braking system and to a vehicle.

2. Description of the Related Art

A hybrid drive has at least two different energy converters and two different energy stores. The converters typically are an internal combustion engine and at least one electric motor. The energy store for the internal combustion engine is a supply of combustible fuel. The energy store for the electric motor may be a battery that can be charged, a high-performance capacitor or a flywheel.

A hybrid vehicle has an advantage over conventional vehicles with an internal combustion engine in that the hybrid vehicle can recover a large proportion of the braking energy, except for an efficiency loss. This feedback or temporary storage of the energy, is referred to as recuperation and takes place during active braking of the vehicle and during overrunning. Overrunning identifies the condition when the vehicle is being propelled forwards only by its own inertia mass and the internal combustion engine is not actively driving the vehicle. The recovered or recuperated braking energy is stored temporarily in the energy store, and can be used again when required. In this case, the electric motor is operated as a generator and acts as a mechanical/electrical converter. However, the generator operation of the electrical machine also results in braking. Thus, in addition to the conventional mechanical brakes, which are generally operated hydraulically, pneumatically or electromechanically, the electrical machine that can be operated as a generator represents a so-called regenerative brake or electrical brake.

Braking can be carried out entirely using the conventional brakes. In this case, the electrical machine is not activated and there is no recuperation. In addition, it is also feasible for a braking process to be carried out additionally or exclusively by the electrical machine being operated in the generator mode. In principle, it is desirable to make use of as high a regenerative braking force as possible when the motor vehicle is being decelerated to recover as much energy as possible by recuperation during deceleration.

The option of recuperative braking problematically affects the brake pressure that must be provided for the conventional mechanical brake. A reduced brake pressure or an increased brake pressure is required depending on whether braking is carried out with or without recuperation. Stronger brake pedal operation therefore is required for a braking process without recuperation than in the case for a braking process with recuperation. This is particularly dangerous when driving a hybrid-drive vehicle in extreme driving conditions, as is in the field of racing sports where the vehicle occasionally is operated in the limit area. However, this assumes that the brake pedal can predetermine a braking process exactly and reproducibly. Different brake pedal pressures are present for the same braking process depending on whether there is recuperation, and hence the vehicle driver cannot be sure that a specific brake pedal pressure will always result in the same braking.

The object of the present invention is therefore to provide better braking operation for a hybrid vehicle, particularly in racing conditions.

SUMMARY OF THE INVENTION

The invention relates to a method for operating a braking system of a hybrid vehicle that can be driven by an internal combustion engine and an electrical machine. The method includes reducing a brake pressure for a mechanical brake in the braking system during braking with recuperation in comparison to the brake pressure during braking without recuperation.

The invention also relates to a braking system for a hybrid vehicle that can be driven by an internal combustion engine and an electrical machine. The system has a brake operating device that can be operated by a driver of the vehicle to initiate a braking process. More particularly, the system has a mechanical brake, an electrical brake and a control apparatus designed to control a braking process in accordance with the method described above.

The invention further relates to motor vehicle, in particular a motor vehicle intended for racing sport, having a hybrid vehicle drive the has an internal combustion engine and an electrical machine. The vehicle has the above-described braking system.

The invention is based on the discovery that braking can be carried out in a hybrid vehicle exclusively by a conventional braking system without recuperation, and also using recuperation provided by the generator operation. More particularly, the invention correspondingly reduces brake pressure for the mechanical brake when braking without recuperation, in comparison to braking with recuperation, because during recuperation, the electrical machine that is operated as a generator adds additional braking torque to the braking torque of the mechanical brake. Overall, braking with recuperation therefore results in a reduction in the brake pressure depending on the recuperatively produced braking torques on the correspondingly braked wheels on an axle. In this case, the brake pedal pressure that is required for braking is adapted appropriately so that as little idling movement as possible occurs when the brake pedal is operated and recuperative braking is being used. The motor vehicle driver therefore has the same brake pedal sensation in each case during a braking process with and without recuperation. In all driving situations, and preferably during racing, the driver now can be sure that a predetermined operation of the brake pedal will result in the braking demanded by him, without the vehicle possibly being overcontrolled, with a dangerous driving situation ensuing.

The brake pressure preferably is set so that the same brake pedal pressure is always present for a predetermined braking process when braking with recuperation and braking without recuperation. Predetermined braking process means braking that is predetermined by the motor vehicle driver by operating the brake pedal with a predetermined braking movement or a predetermined brake pedal pressure.

A conventional braking system with separate mechanical brakes for the individual axles is particularly advantageous in this case. In this situation, the brake pressure for a mechanical brake during braking with recuperation need be reduced only on an axle that can be driven by an electrical machine. The distribution of the brake pressure between the individual axles therefore also remains unchanged whether braking with or without recuperation.

In a preferred refinement, the brake pressure initially is reduced hyperbolically over time during a braking process with recuperation. This hyperbolic reduction in the brake pressure continues until a braking torque provided by the electrical machine that is being operated as a generator reaches a maximum braking torque. This maximum braking torque is a function of the maximum power, and in particular maximum braking power of the electrical machine, which as far as possible should not be exceeded. The electrical machine will produce no more additional braking torque when this maximum braking torque is reached.

The brake pressure during a braking process without recuperation preferably is constant. This is particularly the case when the brake pedal pressure is constant. The brake pressure in this case is approximately directly dependent on the brake pedal pressure, and increases linearly as the brake pedal pressure increases.

A minimum brake pressure produced during a braking process by the conventional mechanical brake is not undershot even if a braking torque that is required for this braking process could be provided completely by the electrical machine that is being operated in the generator mode. This is advantageous for safety reasons. For example, it would be possible during a braking process for the energy store to actually be charged completely by a braking process that is being carried out. Accordingly, regenerative braking would then no longer be possible. In these situations, the mechanical brake, which had been inactive until then, would have to take over the braking process immediately and without any delay. This would generally be difficult to consider since a certain amount of time always passes for building up an appropriate brake pressure. For these reasons, it is advantageous for the conventional brake always to contribute to a predetermined minimum brake pressure so that the conventional brake can take over the complete braking process immediately if required. The minimum brake pressure preferably indicates a fixed percentage minimum proportion of the braking torque required for a respective braking process, for example at least 20% of the total braking torque. Alternatively or in addition to a proportion such as this, a fixed absolute value also is possible, that is a predeterminable brake pressure value.

In one refinement, only the mechanical brake is activated initially during a braking process. An electrical brake then additionally is activated after a predetermined threshold for the brake pressure of the mechanical brake has been exceeded. A mechanical brake means the brakes that conventionally are used in the vehicle, for example the hydraulically, pneumatically or electromechanically operated brakes. In contrast, the regenerative or electrical brake denotes the electrical machine that is operated in the generator mode.

A control device controls the setting of the brake pressure. The control device can control the regenerative brake so that the electrical machine provides a predetermined braking torque. The control device can also control the mechanical brake to provide the desired braking torque above an appropriate brake pressure.

A controllable pressure production apparatus preferably is provided to set the brake pressure for the mechanical brake on the basis of a control signal that is predetermined by the control device. In the same manner, the control device also can control the electrical machine to provide a desired braking torque.

Information about the actual and present magnitude of the brake pressure is advantageously is required to allow the control device to set a desired brake pressure in a defined manner. A pressure measurement device is provided for this purpose. The pressure device always determines the current brake pressure and transmits information about the determined current brake pressure to the control device.

A pedal pressure measurement device preferably records operation of the brake operating device when a braking process takes place, determines information about the present pedal pressure and/or determines information about the pedal movement carried out during operation of the brake pedal. The pedal pressure measurement device then transmits to the control apparatus information about the determined pedal pressure or the pedal movement carried out.

The mechanical brake preferably is in the form of a hydraulically controllable drum and/or disk brake and preferably has a braking force booster.

The brake operating device preferably is a brake pedal that may be mechanical or electrical, as in a so-called brake-by-wire brake.

The above refinements and developments can be combined with one another as desired, where worthwhile. Further possible refinements, developments and implementations of the invention also include combinations which have not been mentioned explicitly of features of the invention described above or in the following text with reference to the exemplary embodiments. In particular, a person skilled in the art may also add individual aspects as improvements or additions to the respective basic form of the present invention.

The present invention will be explained in more detail in the following text with reference to the exemplary embodiments, which are indicated in the schematic figures of the drawing.

DETAILED DESCRIPTION OF THE PREFERRED EMBODIMENTS

Unless stated to the contrary, elements that are the same and have the same function are provided with the same reference symbols in the figures.

Figure 1:
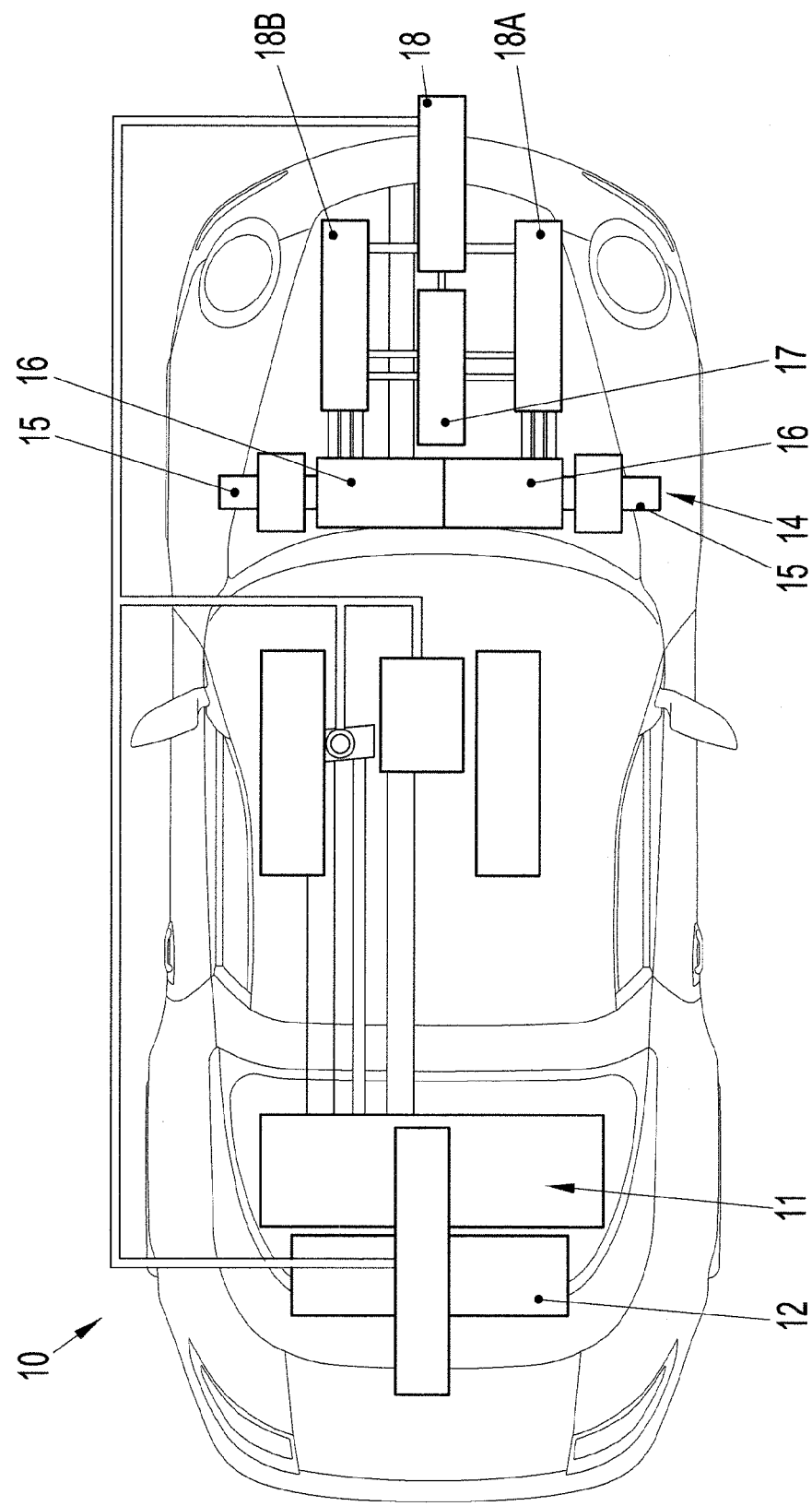
FIG. 1 is a schematic illustration of a vehicle according to the invention.

A hybrid vehicle according to the invention is identified by the number 10 in FIG. 1. The vehicle 10 has a coupled axle drive system that is illustrated only schematically and in a highly simplified form. The vehicle 10 has an internal combustion engine 11, which in this embodiment is in the rear area of the vehicle 10. The internal combustion engine 11 drives the two wheels on the rear axle 13 via a first conventional axle drive apparatus 12.

The coupled drive system also has a second electrical axle drive apparatus 14 that drives at least one wheel and preferably both wheels on the front axle 15. The electrical drive apparatus 14 in this embodiment has left and right electrical machines 16 to drive the respective left and right wheels on the front axle 15. The electrical machines 16 preferably are separate from one another, or at least independent of one another, and drive the respective wheels on the front axle 15 independently of one another. However, it is feasible to provide only one electrical machine 16 to drive both wheels on the front axle.

In this case, by way of example, the electrical machines 16 are electric motors, that also can be operated as generators for recuperation to recover and feeding back electrical energy. When being operated as electric motors, these electrical machines 16 drive the respective wheel associated with them via a respective spur-gear stage or a universally jointed shaft. An electrical energy store 17 is provided to supply power to the electrical machines 16. This electrical energy store 17 may be a rechargeable battery, for example a high-voltage battery, or a high-power capacitor, for example a so-called supercap. However, the invention is not restricted to these examples of electrical energy stores 17. In principle, any type of energy store or combination of energy stores suitable for supplying the necessary power to the electrical machines may be provided. For example, a mechanical energy store may be provided, such as an electrical flywheel that outputs stored kinetic energy to the electrical machine 16 when required.

The electrical machines are connected to the electrical energy store 17 via the motor vehicle power supply system. The electrical energy store 17 thus feeds power into the motor vehicle power supply system, which then is tapped off as required by the electrical machine 16 that is operated as an electric motor. In contrast, electrical power can be fed back into the motor vehicle power supply system and into the electrical energy store 17 when electrical machine 16 is operated as a generator and is producing electrical power (the recuperation mode). Furthermore, a converter apparatus 18A, 18B (not shown) can be provided to convert the direct current or the DC voltage of the electrical energy store 17 to an alternating current, as required for the electrical machine 16.

A control apparatus 18 is provided to controls the operation of the electrical machine, and therefore the driving of the two wheels of the front axle 15. The vehicle 10 can be operated in a two-wheel drive mode or a selectable four-wheel drive mode by means of the control apparatus 18. By way of example, in the two-wheel drive mode, only the rear axle 13 of the vehicle 10 is driven via the internal combustion engine 11. If required, four-wheel drive can be connected. This connection can be selected for example manually by the motor vehicle driver, for example by pushing a button. However, the four-wheel drive can be selected fully automatically by the control device 18, as a function of the respective driving situation. For example, the control device 18 can be connected when driving round a turn or at a predetermined torque on the rear axle 13. This stabilizes the dynamics of the vehicle, since the front axle 15 now also is used for propulsion. Overall this improves the dynamics and the vehicle safety in these situations.

Figure 2:
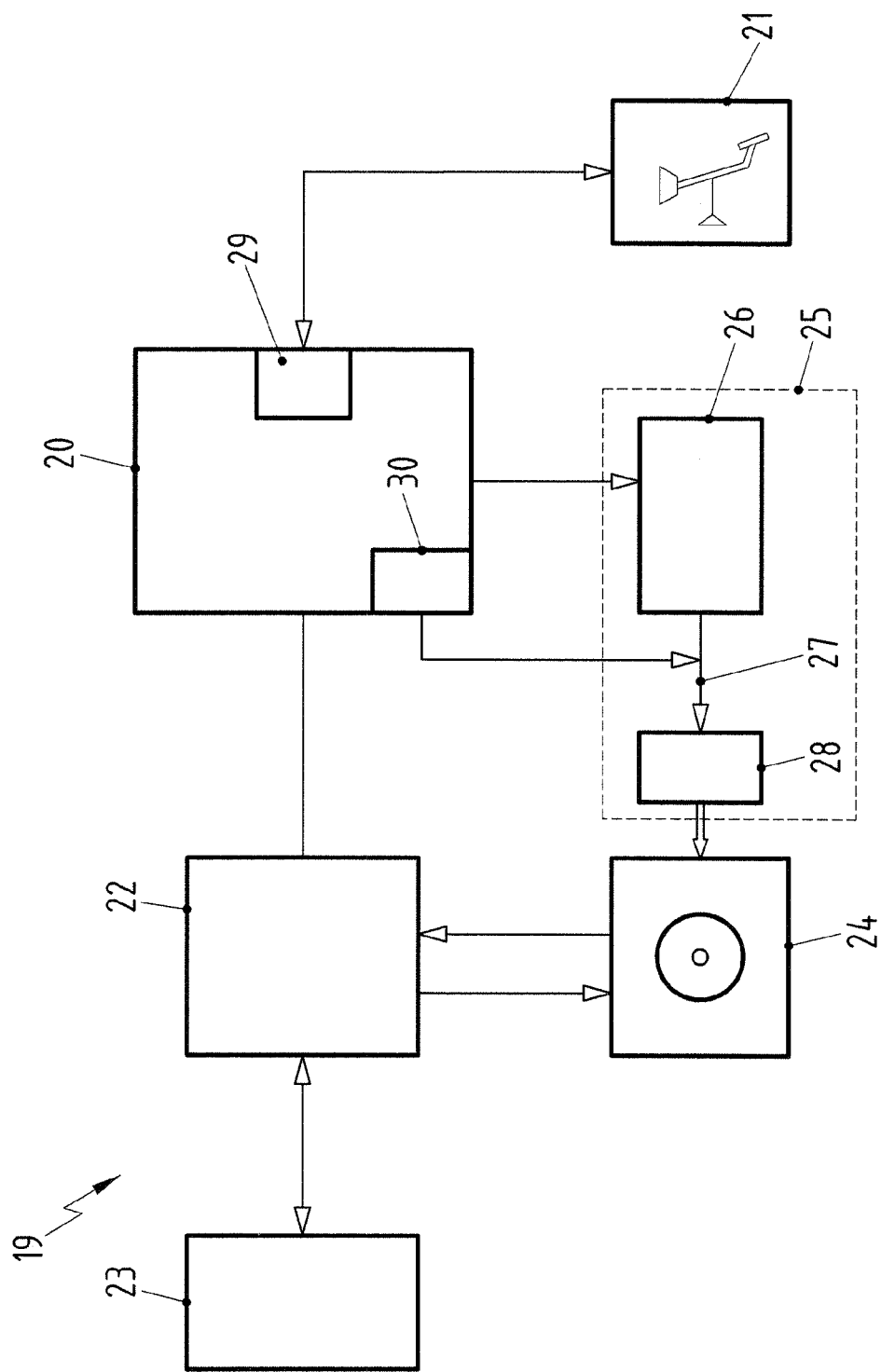
FIG. 2 is a block diagram of an arrangement having a braking system according to the invention.

FIG. 2 is highly schematic block diagram of a braking system 19 for the hybrid vehicle illustrated in FIG. 1. The braking system 19 has a brake controller 20 that is connected to a brake operating device 21 that may, for example, be a brake pedal with a position transmitter. Without any restriction, in the case of recuperative braking in this embodiment, the entire available braking movement is split in the ratio 30:70 between the electrical brake and the mechanical brake. However, it is highly beneficial and advantageous for the first 20% to be used initially as a mechanical braking movement, for safety reasons. Furthermore, other splits also are feasible, but for safety reasons, it is advantageous for the electrical braking movement to be considerably less than 50% to have an adequate mechanical braking movement available in the event of a failure, in particular for brake operation that can be controlled sufficiently finely.

FIG. 2 shows an electrical machine 22 that can be operated both as an electric motor and as a generator. In the generator mode, the electrical machine 22 produces a braking torque. In addition, in this generator mode, the electrical machine 22 produces electrical power that is fed into an electrical energy store 23. In the electric motor mode, the electrical machine 22 taps electrical power off from the energy store 23 and is operated as an electric motor. In the generator mode, the braking effect of the electrical machine 22 acts on an output drive 24, while the braking energy from the output drive 24 is fed back via the electrical machine 22 as electrical power to the energy store 23. Parts of the drive train, the gearbox, the vehicle axles, the wheels and rotating parts such as these may be used as the output drive 24.

The energy store 23 may reach a predetermined saturation level (state of charge) in which the electrical machine 22 can no longer feed electrical power into the energy store 23. Thus, the electrical machine 22 is no longer available for braking. In this case, the conventional braking system 25 completely takes over a braking process. The conventional braking system 25 has a pressure production device 26 to select a predetermined brake pressure. This pressure production device 26 can be used to produce a brake pressure that acts, for example, via a hydraulic line 27 on a braking device 28, such as a drum brake or disk brake. The hydraulically controllable braking device 28 acts on the output drive 24.

The brake pressure in the hydraulic line 27 can be measured via a pressure measurement device 30 provided in the brake controller 20. Furthermore, the brake control device 20 also has a pedal pressure measurement device 2.9 for measuring a pedal pressure that is predetermined via a motor vehicle driver.

The conventional braking system 25 advantageously is equipped with a braking force booster to reduce the force that has to be applied by the driver to the brake pedal for the same braking effect. It also would be feasible to provide so-called brake-by-wire brake control, in which the brake operating device 21 only indicates a braking process, and the brake pedal movement through which the brake pedal moves is intended to indicate the desired strength and the extent of the braking. The rest of the braking then is provided by the brake controller 20, which appropriately controls both the conventional braking system 25 and the electrical machine 22 that is being operated as a generator. Thus, the brake controller splits the braking process between these systems.

Figure 3A:
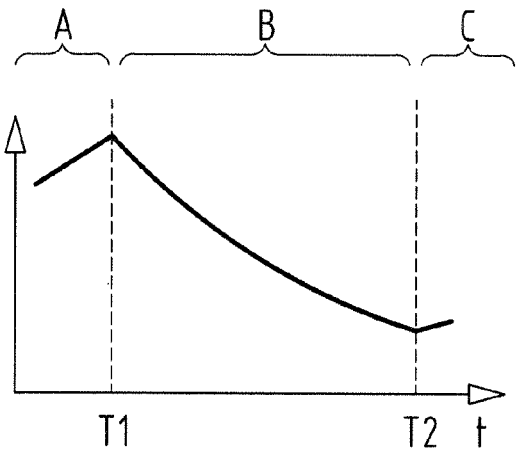
FIGS. 3A-3D show signal/time graphs for the speed, the braking torque, the brake pressure and the pedal pressure to explain the method of the invention.
Figure 3B:
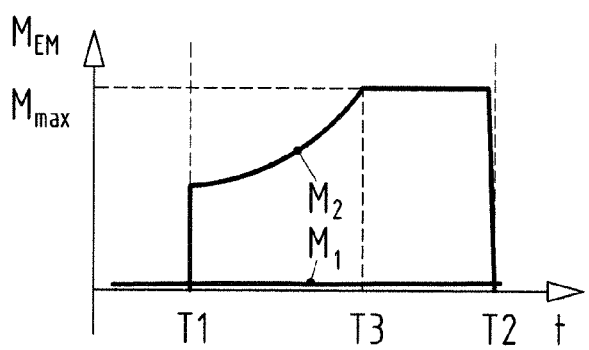
Figure 3C:
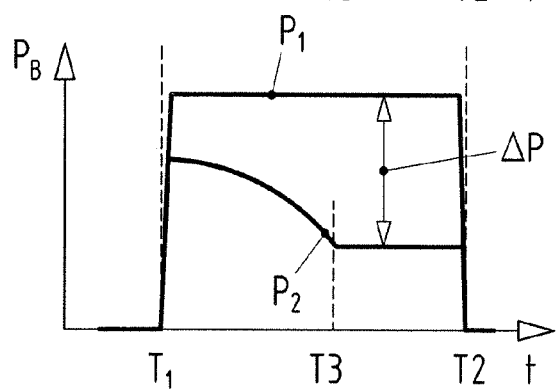
Figure 3D:
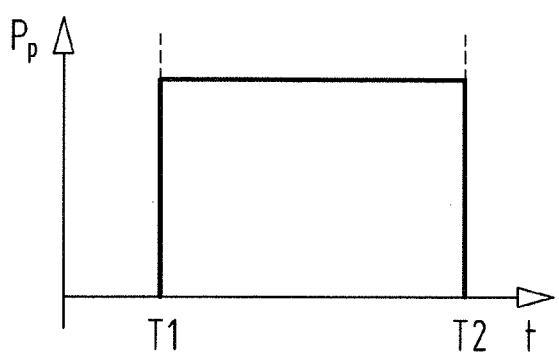

FIGS. 3A-3D show various signal/time graphs to explain the method of the invention. FIG. 3A shows the speed v of a vehicle plotted against the time t. FIG. 3B shows the electrical braking torque $M_{EM}$ applied by the electrical machine plotted against the time t, and FIG. 3C shows the brake pressure $P_B$ produced by the conventional braking system plotted against the time t. FIG. 3D shows the brake pedal pressure $P_P$ plotted against the time. FIGS. 3B-3D each show the corresponding signal/time curves with and without recuperation, that is with and without use of the electrical machine acting as a brake.

The graph in FIG. 3A shows three sections A to C. The vehicle is accelerated in section A and as a result the speed v increases. The vehicle is decelerated in section B from the time T1 to the time T2 by braking, and as a result the speed v is reduced. After the time T2, the vehicle is accelerated again in the section C, and as a result the speed v increases again.

FIG. 3B shows the corresponding electrical braking torques $M_{EM}$ for the sections A to C. During acceleration in the sections A and C, the braking torque is equal to 0. Braking is initiated from the time T1. In the case of braking without recuperation $M_1$, the electrical machine is inactive. In this case, the braking torque $M_1=0$ is added by the electrical machine. In the case of braking with recuperation, the electrical machine at least partially takes over a portion of the braking force required for braking. Here, the braking torque $M_2$ provided by the electrical machine increases at the time $T1$, that is with the start of the braking, first of all immediately. The braking torque $M_2$ then rises corresponding to the maximum torque profile of the electrical machine (shown here as being hyperbolic) moderately until the time $T3$ (where $T1<T3<T2$). This corresponds to the torque of the electrical machine, which rises correspondingly as the rotation speed falls. After the time $T3$, the braking force provided by the electrical machine remains constant. This constant braking force corresponds to the rating of the electrical machine, where the electrical machine reaches the maximum (braking) power that can be demanded by the brakes. The electrical machine then no longer can produce any more braking power without exceeding the maximum power and thus endangering the operation of this electrical machine. The braking torque $M_{max}$ still remains constant until the time $T2$, that is until the end of the braking process.

FIG. 3C shows the brake pressure $P_B$ provided by the mechanical brake. In the case of braking without recuperation, the mechanical brake carries out all of the braking, as a result of which the brake pressure $P_1$ is then constant. In this case, it is assumed that the driver has operated the brake pedal to a constant extent. There may also be a rising, falling or other varying braking curve for the brake pressure $P_1$ here, depending on the driver demand, depending on the extent to which the driver operates the brake pedal. In the case in which a braking process is carried out with recuperation, the electrical machine provides a portion of the total braking torque (see FIG. 3B). In consequence, however, the mechanical brake need no longer provide the entire braking torque and therefore also not the entire brake pressure. For this reason, the brake pressure $P_2$ provided by the mechanical brake is reduced in an appropriate manner during braking with recuperation. At the time $T1$, the mechanical brake therefore does not provide the entire brake pressure $P_2$ which would exist in the case of braking without recuperation, but a brake pressure $P_2$ reduced by $\Delta P$. This brake pressure $P_2$ decreases hyperbolically over time until the time $T3$. After the time $T3$, the brake pressure of the mechanical brake has a constant profile again, since the maximum braking torque $M_{max}$ which can be provided by the electrical machine has also been reached here.

FIG. 3D shows the pedal pressure $P_B$ on the brake pedal in the case of braking with and without recuperation. Irrespective of whether a brake pressure without recuperation or with recuperation is now selected, as shown in FIG. 3C, the pedal deflection of the brake operating device 21 is identical. This is selected by the brake controller. The vehicle driver therefore does not perceive this difference and advantageously has an identical sensation when the brake pedal is operated in the case of braking with and without recuperation.

What is claimed is:

1. A method for operating a braking system of a hybrid vehicle that can be driven by an internal combustion engine and an electrical machine that is in communication with an energy storage, the method comprising: actuating a brake operating device; applying a brake pressure with a mechanical brake in the braking system in response to the actuation of the brake operating device; monitoring the energy storage to determine whether braking by recuperation is possible; operating the electrical machine as a generator to carry out a gradual increase of braking by recuperation if recuperation is determined to be possible and simultaneously gradually reducing the brake pressure while maintaining braking by recuperation to less than a specified amount or proportion of total braking.

2. The method of claim 1, further comprising setting the brake pressure so that a brake pedal pressure is constant for a predetermined braking process when braking with recuperation and when braking without recuperation.

3. The method of claim 1, wherein the brake pressure during a braking process with recuperation initially is reduced corresponding to a torque of the electrical machine over a specified time.

4. The method of claim 3, further comprising reducing the brake pressure until the torque provided by the electrical machine that is operated in a generator braking mode has reached a maximum braking torque, wherein the maximum braking torque is a function of the maximum power of the electrical machine.

5. The method of claim 1, wherein the brake pressure is not reduced during a braking process without recuperation.

6. The method of claim 1, wherein, during a braking process, at least a minimum brake pressure is provided even if a braking torque that is required for braking can be provided completely by the electrical machine that is being operated as a generator.

7. The method of claim 6, wherein the minimum brake pressure indicates at least 50% of the total braking torque required for a braking process.

8. The method of claim 1, wherein only the mechanical brake is activated initially during a braking process, and wherein the electrical machine additionally is activated after a predetermined threshold for the brake pressure has been exceeded.

9. A braking system for a hybrid vehicle that can be driven by an internal combustion engine and an electrical machine, the system comprising:
a brake operating device that can be operated by a driver of the vehicle to initiate a braking process;
a mechanical brake;
an electrical machine; and
a control apparatus configured to control a braking process in accordance with the method of claim 1.

10. The braking system of claim 9, having a controllable pressure production device that sets the brake pressure on the basis of a control signal that is predetermined by the control device.

11. The braking system of claim 9, further comprising a pressure measurement device that determines the brake pressure in the braking system and makes information about the determined brake pressure available to the control apparatus.

12. The braking system of claim 9, further comprising a pedal pressure measurement device to record operation of the brake operating device and to make information about a determined pedal pressure available to the control apparatus.

13. The braking system of claim 9, wherein the mechanical brake is a drum brake or a disk brake that can be operated hydraulically and has a braking force booster.

14. The braking system of claim 9, wherein the brake operating device is a brake pedal.

15. The braking system of claim 9, wherein separate mechanical brakes are provided for individual axles of the hybrid vehicle.

16. A motor vehicle, comprising:
a hybrid vehicle drive with an internal combustion engine; and
the braking system of claim 9.

17. A brake operating method, comprising:
- providing a hybrid vehicle with an internal combustion engine, an electrical machine and a braking system having a mechanical brake;
- determining whether the electrical machine is being operated as a generator; and
- applying brake pressure by the mechanical brake in response to a demand for braking;
- gradually reducing the brake pressure by the mechanical brake when the electrical machine is operated as a generator to account for braking caused by recuperation when the electrical machine is operated as a generator, while maintaining braking torque achieved by recuperation to less than braking torque achieved by the mechanical brake.

18. The method of claim 17, further comprising setting the brake pressure so that the same brake pedal pressure is present for a predetermined braking process when braking with recuperation and when braking without recuperation.

19. The method of claim 17, wherein the brake pressure during a braking process with recuperation initially is reduced corresponding to a torque of an electrical machine over a specified time.

20. The method of claim 19, further comprising reducing the brake pressure until a braking torque provided by the electrical machine that is operated in a generator braking mode has reached a maximum braking torque, wherein the maximum braking torque is a function of the maximum power of the electrical machine.

* * * * *